United States Patent
Baholzer

(10) Patent No.: US 11,589,966 B2
(45) Date of Patent: Feb. 28, 2023

(54) HEATING ELEMENT FOR A DENTAL-CERAMIC FURNACE AND DENTAL SINTERING FURNACE

(71) Applicant: Vita Zahnfabrik H. Rauter GmbH & Co. KG, Bad Saeckingen (DE)

(72) Inventor: Thomas Baholzer, Bad Saeckingen (DE)

(73) Assignee: Vita Zahnfabrik H. Rauter GmbH & Co. KG, Bad Saeckingen (DE)

( * ) Notice: Subject to any disclaimer, the term of this patent is extended or adjusted under 35 U.S.C. 154(b) by 514 days.

(21) Appl. No.: 16/548,069

(22) Filed: Aug. 22, 2019

(65) Prior Publication Data
US 2020/0129276 A1   Apr. 30, 2020

(30) Foreign Application Priority Data
Oct. 29, 2018 (EP) .................................... 18203114

(51) Int. Cl.
| | |
|---|---|
| *A61C 13/20* | (2006.01) |
| *F27B 17/02* | (2006.01) |
| *F27D 11/02* | (2006.01) |
| *H05B 3/08* | (2006.01) |
| *H05B 3/12* | (2006.01) |
| *H05B 3/44* | (2006.01) |

(52) U.S. Cl.
CPC ............ *A61C 13/20* (2013.01); *F27B 17/025* (2013.01); *F27D 11/02* (2013.01); *H05B 3/08* (2013.01); *H05B 3/12* (2013.01); *H05B 3/44* (2013.01)

(58) Field of Classification Search
CPC ....... A61C 13/20; F27B 17/025; F27D 11/02; F27D 2099/0008; F27D 2099/0011; F27D 99/0006; H05B 3/08; H05B 3/12; H05B 3/44; H05B 3/62
See application file for complete search history.

(56) References Cited

U.S. PATENT DOCUMENTS

| | | | | |
|---|---|---|---|---|
| 3,375,319 A | * | 3/1968 | Beck ........................ | H05B 3/44 373/127 |
| 4,119,832 A | | 10/1978 | Audesse et al. | |

(Continued)

FOREIGN PATENT DOCUMENTS

| | | |
|---|---|---|
| CN | 202853395 U | 4/2013 |
| DE | 625847 C | 2/1936 |

(Continued)

*Primary Examiner* — Shawntina T Fuqua
(74) *Attorney, Agent, or Firm* — The Webb Law Firm

(57) ABSTRACT

Disclosed is a heating element for a dental furnace including a tube element for accommodating a heating coil inside the tube element. At least one closing element may be connected to at least one open end of the tube element, wherein electrical connectors may be led through the closing element and fused with the element. The tube element may be made from a ceramic material, such as oxide ceramics, that may be connected to the connector via a plurality of intermediate glasses/transition glasses and glass solder to compensate for different heat expansion coefficients such that up to 500° C. gas escaping from the tube element may not enter due to a thermal action, providing that operational safety of the heating element is ensured. Further, disclosed is a dental furnace including such a heating element.

17 Claims, 2 Drawing Sheets

(56) References Cited

U.S. PATENT DOCUMENTS

| | | | | |
|---|---|---|---|---|
| 4,272,670 A * | 6/1981 | Docx | ...................... | F27D 11/02 |
| | | | | 219/390 |
| 2011/0248621 A1* | 10/2011 | Linow | ............... | H01L 21/67115 |
| | | | | 313/317 |
| 2013/0234049 A1* | 9/2013 | Linow | ...................... | H01K 7/00 |
| | | | | 250/492.1 |
| 2019/0101332 A1* | 4/2019 | Schmidt | .............. | F27D 21/0014 |
| 2019/0167395 A1* | 6/2019 | Baholzer | ................ | F27B 17/025 |
| 2020/0038152 A1* | 2/2020 | Jussel | .................... | A61C 13/20 |

FOREIGN PATENT DOCUMENTS

| | | | |
|---|---|---|---|
| DE | 1010207 B | 6/1957 | |
| DE | 19746872 A1 * | 5/1999 | ............. A61C 13/20 |
| DE | 10227566 A1 * | 1/2004 | ............. A61C 13/20 |
| KR | 20150115713 A | 10/2015 | |
| WO | WO-2004106829 A1 * | 12/2004 | ............. A61C 13/20 |

\* cited by examiner

HEATING ELEMENT FOR A DENTAL-CERAMIC FURNACE AND DENTAL SINTERING FURNACE

CROSS-REFERENCE TO RELATED APPLICATION

This application claims priority to European Patent Application No. 18 203 114.6 filed Oct. 29, 2018, the disclosure of which is hereby incorporated by reference in its entirety.

BACKGROUND OF THE INVENTION

Field of the Invention

The invention relates to a dental-ceramic furnace as well as a dental sintering furnace comprising a heating element.

Description of Related Art

For sintering a metal-free dental prothesis, such as zirconium oxide, as well as for firing dental-ceramic compounds onto dental alloys, in particular from zirconium and/or other ceramic materials, dental furnaces comprising different heating elements are known.

As furnaces used for sintering veneering ceramic and firing for the purpose of fixing ornamental painting or brilliance treatment, resistance heaters are known where a heating wire—preferably of Kanthal—in a quartz glass unit is used as a heating element. However, the material allows these heating elements to be used up to max. 1200° C., which suffices for sintering veneering ceramic and performing firing for the purpose of fixing paintings.

For several years, dental restorations have been performed using $SiO_2$ to an increasing extent. Typically, this material is processed in a presintered state and subsequently finally sintered in a sintering furnace. Temperatures of 1200° C. are not sufficient for this purpose, rather temperatures of up to approximately 1650° C. are required. As sintering furnaces meeting these temperature requirements, heating elements of molybdenum silicide, for example, are known. This is a dense metal-ceramic material comprising molybdenum silicide and an oxide fraction, mainly a glass phase. This glass fraction or a protective layer changes during the heating phase. This may lead to flaking and thus to contamination in the firing chamber and hence to contamination of the object to be sintered. The flakes in the form of small glass splinters and glass dust contaminate the firing chamber and/or the object to be sintered.

The following dissolution of the oxide layer on such a heating element leads to the formation of $MoO_3$ (molybdenum trioxide). This leads to an undesired green-yellow coloring of the dental object to be sintered or fired. Such coloring can only be prevented by using so-called sintering trays with a cover. This requires a complex configuration of the dental furnaces. Further, it is necessary to perform firing for cleaning purposes for renewing the oxide layer on the heating element. This involves a considerable amount of time and energy since such a firing for cleaning purposes must be performed for at least 4 hours at temperatures above 1400° C. without loading of the dental furnace.

In addition, it is common practice to use heating elements of silicon carbide. This is a ceramic material which is, however, prone to breaking. The installation of such a heating element in the firing chamber of the dental furnace is thus very complex and complicated. In particular, such a heating element must not be subjected to any forces or even moments. On the other hand, it is required that the firing chamber is adapted to be evacuated for the purpose of firing dental-ceramic compounds. This requires that the ends of the heating element are led out of the firing chamber. This is realized via a vacuum-tight through-going opening in the housing of the firing chamber. Here, a force and possibly a moment is exerted on the firing element. In the case of heating elements from silicon carbide, this may lead to damage and in particular to a complete destruction of the heating element. In addition, when a plurality of heating elements from silicon carbide are used, it is important that only elements having the same electric resistance are interconnected. Thus, the heating elements must be replaced. Although it is possible to replace only individual heating elements, this may result in failure of further heating elements within a very short time and is thus not reasonable. Replacement of all heating elements of a furnace entails considerable costs.

In addition, it is common practice to sinter dental objects by induction. However, when sintering by induction is performed, the size of the firing chamber is limited to a large extent. Further, when loading the firing chamber, care must be taken that the firing chamber is not damaged since damage to the inner wall of the furnace chamber would lead to a change of the induction behavior. In addition, the possible use of a dental induction furnace is limited to a large extent since the properties of the material to be treated and the inductor/susceptor must exactly match each other for achieving the proper thermal behavior. The field of application is limited to a large extent due to the dependence on material parameters in the case of inductively operating dental furnaces.

SUMMARY OF THE INVENTION

The present disclosure discloses a heating element for a dental furnace offering improved application possibilities. Further, the present disclosure discloses a dental furnace comprising such a heating element.

According to the present disclosure, described are embodiments including a heating element as well as embodiments including a dental furnace.

The heating element for a dental furnace according to the invention comprises a tube element for accommodating a heating coil inside the tube element. The tube element is closed at least on one side by a closing element. The closing element closes an open end of the tube element. The second end of the tube element can be closed or is adapted to be closed by another closing element. The at least one closing element serves for leading out the electric connecting element for the heating coil. When two closing elements are provided for a heating element, the electric connecting elements can either be led out of the two closing elements or only out of one of the two closing elements. According to the invention, the tube element may be made from a ceramic material. For the material, in particular oxide ceramics may be included. Such oxide ceramics may be used which have a high heat resistance, preferably up to above 1700° C., in particular up to above 1800° C. In particular, ceramic materials can be used which attain a high vacuum tightness or a low leakage rate, in particular below $10^{-8}$ mbar*l/s (as per Helios leakage test) under the operation conditions according to the invention.

It is particularly preferred that the ceramic material comprises or is made from oxide ceramics selected from the group consisting of aluminum oxide, titanium oxide, zirconium oxide, magnesium oxide, zinc oxide, aluminum titanate, barium titanate and yittrium oxide as well as mixtures thereof. For preventing contamination during the use of the heating elements or the dental furnace according to the invention, oxide ceramic materials with a high degree of purity have proven advantageous. According to a preferred embodiment of the present invention, the fraction of oxide ceramics in the tube element exceeds 90% by weight, preferably 95% by weight, in particular 97% by weight, and especially 99% by weight or 99.5% by weight in relation to the total weight of the tube element material.

Especially preferred is aluminum oxide or zirconium oxide or yittrium oxide each having a degree of purity exceeding 95% by weight, preferably 97% by weight, in particular 98% by weight, and especially 99.5% by weight.

Providing a tube element made from the above-mentioned material in particular offers the advantage that for firing dental-ceramic compounds onto dental alloys, such as zirconium and/or other ceramic materials, at temperatures of up to 1100° C. good results can be attained. The same applies to sintering a metal-free prothesis, such as from zirconium oxide or a similar material, in particular at up to 1600° C. In particular, use of the above-mentioned materials for the tube element prevents flaking of material particles, such as glass splinters/gas dust, for example, which flaking occurs when molybdenum silicide is used. Further, the tube element made from the above-mentioned material is considerably less sensitive to forces and moments such that in particular the heating element according to the invention can be reliably led through a through-going opening of a housing of a firing chamber and fixed in this through-going opening.

The at least one closing element, which preferably serves for accommodating the electrical connectors and for leading out the electrical connectors, is preferably made from quartz glass and/or borosilicate glass.

Connecting the at least one closing element to the tube element is preferably realized by means of glasses and/or glass solder.

In a particularly preferred aspect of the invention, the heat expansion coefficients of the materials used, in particular of the tube element and the at least one connecting element, are similar to each other, preferably essentially identical.

According to another particularly preferred embodiment of the heating element according to the invention, which is an independent invention, the heat expansion coefficient of the tube elements ranges from $8.8 \times 10^{-6}$ $K^{-1}$ to $9.2 \times 10^{-6}$ $K^{-1}$. Usually, the heating expansion coefficient for the closing element of quartz glass and/or borosilicate glass serving for accommodating the electrical connectors and for leading out the electrical connectors ranges from $0.5 \times 10^{-6}$ $K^{-1}$ to $3.3 \times 10^{-6}$ $K^{-1}$. A direct connection of the heating element and the closing element is therefore problematic due to thermally induced mechanical stresses occurring during the use according to the invention.

For preventing stress cracks and thus leaks in the heating element, it is preferred to provide at least one intermediate element between the tube element and the closing element. Here, the at least one intermediate element has a heat expansion coefficient ranging between the heat expansion coefficients of the tube element and the closing element. It is particularly preferred that a plurality of intermediate elements are provided, each having a different heat expansion coefficient, such that the heat expansion coefficient is gradually adjusted. Here, it is preferred that, as an intermediate element, intermediate glasses or transition glasses are used for compensating or for adjusting the different heat expansion coefficients.

When intermediate elements from quartz glass are used for the electrical connectors, preferably 10-15 intermediate glasses are required and fused with each other, and when borosilicate glass is employed, 5-10 intermediate glasses for the tube element made from aluminum oxide or zirconium oxide or yittrium oxide are required and fused with each other. Connections fused from the intermediate glasses and extending from the tube element to the connection element prevent stresses and thus cracking between the individual glasses due to the respective adjusted heat expansion coefficients and ensure the vacuum tightness or leakage rate of in particular less than $10^{-8}$ mbar*l/s.

The tube element is fused via the at least one intermediate element, in particular the plurality of intermediate glasses, such that in this range at temperatures of up to 500° C. a vacuum tightness or leakage rate of in particular less that $10^{-8}$ mbar*l/s is ensured.

It is further possible to strongly cool the heating element in the area of the transition between the tube element and the closing element and/or to provide a long transition such that stresses are avoided and the risk of cracking is strongly reduced.

According to a preferred embodiment, the heating coil arranged inside the tube element is a heating coil made from tungsten and/or molybdenum. In particular, the material of the heating coil consists of high-fusing metals or metal alloys. Advantageously, the fusion temperatures of the materials used exceed 2000° C., preferably 2500° C., in particular 2600° C. According to one embodiment, the fusion temperatures of the heating coil are in particular at least 2600° C. or at least 3400° C.

Preferably, the tube element in which the heating element is arranged is filled with a protective gas. In particular the noble gases selected from the group consisting of argon, neon and krypton as well as any mixture thereof have proven suitable as protective gas or inert gas. Here, the tube element is preferably gastight such that no protective gas can enter the firing chamber. A corresponding gas tightness is also achieved when inside the firing chamber of the dental furnace a pressure reduced relative to the atmospheric pressure prevails. For this purpose, pressures in the range from 20 mbar to 1 bar, in particular in the range from 50 mbar to 950 mbar can be used.

Further, the invention relates to a dental furnace including a heating element which may be configured as described above. The dental furnace comprises a housing defining a firing chamber. In the firing chamber, the dental element to be fired or sintered is arranged. This process is usually performed on a firing table which may be movable. Inside the firing chamber, at least one heating element is arranged. For this purpose, the housing of the dental furnace comprises at least one through-going opening, wherein a heating element is passed through or inserted into the firing chamber through a respective through-going opening. Here, the heating element according to the invention as described in particular on the basis of preferred aspects, is arranged such that the closing element is disposed outside the firing chamber and in particular outside the housing. The closing element is thus not subjected to the high temperatures prevailing in the firing chamber.

The at least one through-going opening is preferably closed by a sealing element. The sealing element in particular also serves for generating a vacuum inside the firing chamber. Further, the sealing element may hold or fix the heating element. Here, the sealing element is preferably of an annular configuration and surrounds the heating element. Here, the heating element is in particular held in an area of the tube element such that the closing element, i.e. preferably the glass elements, is completely disposed outside the housing of the firing chamber.

In addition, it is preferred that opposite each through-going opening an element for accommodating the heating element is arranged. This accommodation element, which may be a non-through-going opening in the housing, accommodates in particular the free end of the heating element, i.e. that end of the heating element where no closing element is provided. If the heating element is connected to a closing element on both sides, it is preferred, according to an alternative embodiment, that opposite each through-going opening another through-going opening is arranged such that the second closing element projects from the housing of the firing chamber on the opposite side.

BRIEF DESCRIPTION OF THE DRAWINGS

The present disclosure is explained in detail with reference to the accompanying drawings in which.

DESCRIPTION OF THE INVENTION

A dental furnace comprises a housing 10 which, in the illustrated embodiment, has an essentially circular-cylindrical cross-section and defines a firing chamber 12 in its interior. The inside of the housing 10 is provided with a high-temperature insulation 14. With the aid of a firing table 16 it is possible to feed dental elements to be fired or sintered which are arranged on an upper surface 18 of the firing table 16 into the firing chamber 12. Further, the firing chamber 12 is closed by a cover not illustrated on its upper side. Via the latter, vacuum connections for generating a vacuum in the firing chamber may be connected, for example.

Figure 1:
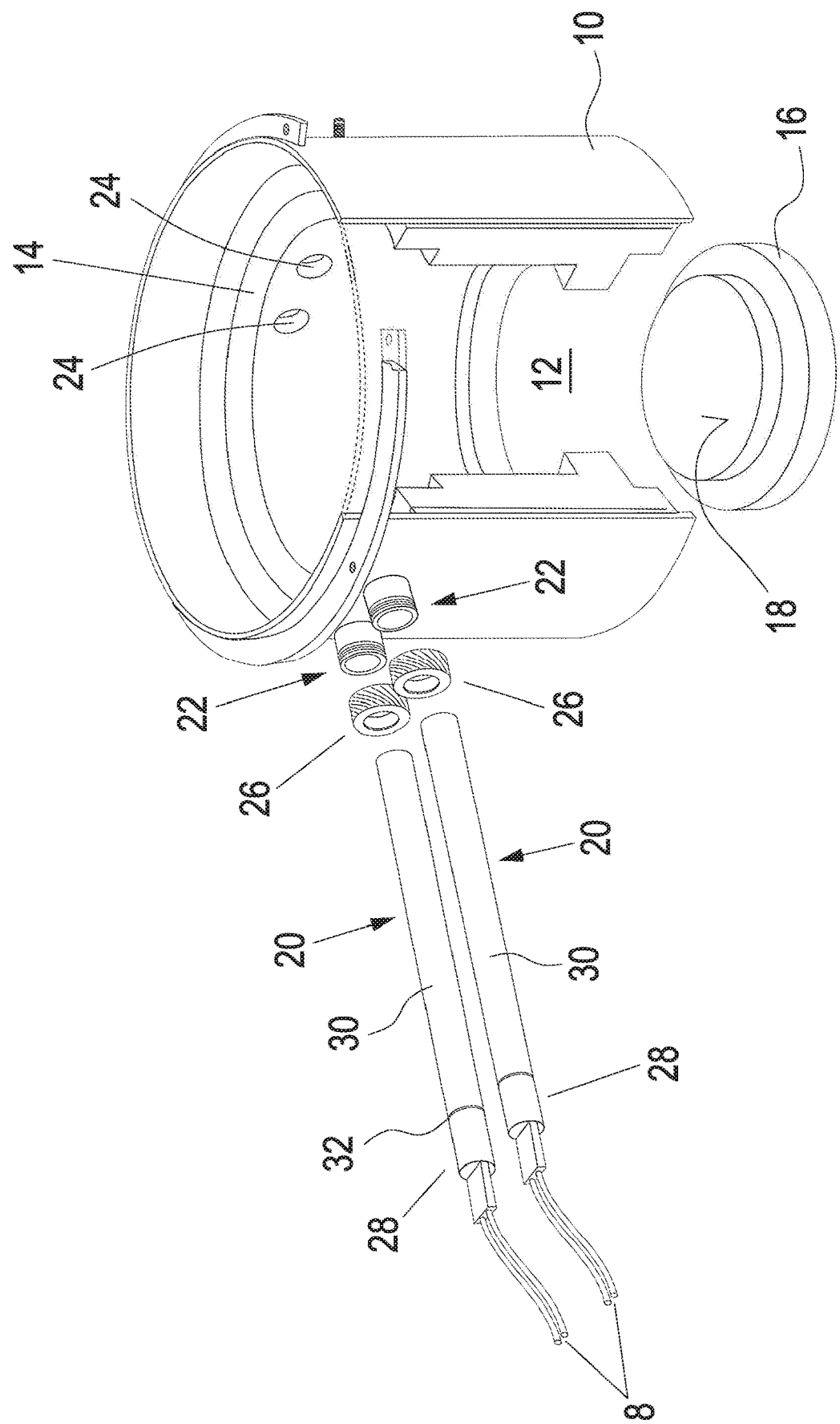
FIG. 1 shows a simplified schematic perspective view of components of a firing chamber of a dental furnace according to embodiments of the present disclosure.

In the illustrated exemplary embodiment, two heating elements are arranged in the firing chamber 12, wherein, in FIG. 1, the heating elements are illustrated before installation. The two heating elements 20 are each inserted into the firing chamber through a through-going opening 22 provided in the housing 10. For fixing the heating elements 20 in the firing chamber, on the one hand accommodation elements 24 are provided opposite the through-going openings 22, which accommodation elements are non-through-going openings in the illustrated exemplary embodiment into which the free ends of the heating elements 20 are inserted. On the other hand, the heating elements 20 are fixed in the inserted state with the aid of sealing elements 26. In the illustrated embodiment, the latter annularly surround the heating elements and can be fixed in provided threads at studs of the through-going openings 22, for example. In the installed state, the sealing elements 26 surround the tube element 30 in front of the area of closing elements 40.

The heating elements are preferably fastened or sealed exclusively in the area of the tube element 30.

In the transition area, preferably a connection via intermediate elements, which may in particular be a plurality of intermediate glasses/transition glasses/glass solder 40 or any other connecting material, is further provided for connecting the closing elements 28 to the tube elements 30. Here, the individual intermediate elements have different heat expansion coefficients such that, proceeding from the heat expansion coefficient of the tube element 30, the heat expansion coefficient is gradually or stepwise adjusted to the heat expansion coefficient of the closing element 28.

Figure 2:
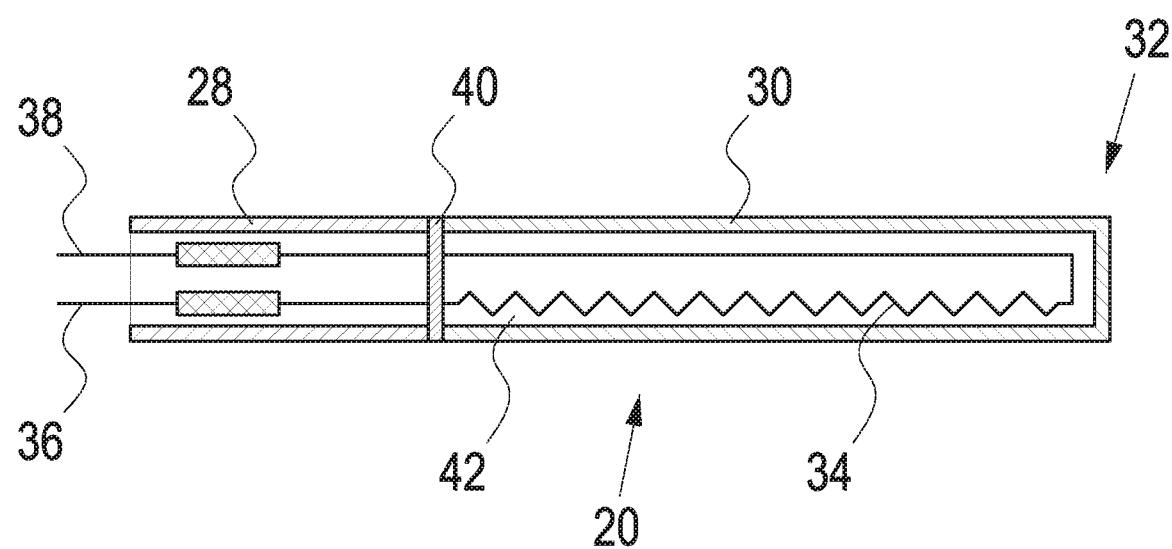
FIG. 2 shows a schematic sectional view of a heating element according to embodiments of the present disclosure.

The configuration of the heating elements 20 is in particular shown in FIG. 2. The illustrated embodiment of the heating elements 20 comprises a tube element 30. In the illustrated exemplary embodiment, the tube element 30 is closed at its free end 32. In this embodiment, the free end 32 is inserted into recesses 24. Inside the hollow tube element 30, a heating coil 34 is arranged. Two electrical connectors 36/38 of the heating coil are led out of the at least one intermediate element 40 as well as out of the closing element 28 and fused. The closing element 28 is fused to the tube element 30, for example via a glass solder adjusted to the respective heat expansion coefficient and a plurality of intermediate glasses/transition glasses which also have the respective adjusted heat expansion coefficient.

In a hollow space 42 of the heating element 30 accommodating the heating coil 34, a protective gas argon, neon, krypton is provided.

Alternatively to the embodiment illustrated in FIG. 2, the heating coil may be configured such that the connecting element 36/38 is led out on the left side of the tube element 30 in FIG. 2. In this exemplary embodiment, a second closing element configured similarly to the closing element 28/40 would be arranged on the right side and also be connected to the tube element 30 via glass solder as well as a plurality of intermediate glasses/transition glasses for adjusting to the different heat expansion coefficients. These adjusted heat expansion coefficients ensure that the tube element filled with a protective gas/inert gas argon/krypton has a leakage rate of less than $10^{-8}$ mbar*l/s.

The invention claimed is:

1. A dental furnace comprising a heating element, the heating element comprising:
   a tube element for accommodating a heating coil inside the tube element, and
   at least one closing element for closing an open end of the tube element,
   wherein electrical connectors are led out through the at least one closing element,
   wherein the heating coil is operated in the dental furnace and in the tube element which is filled with a protective gas,
   wherein the at least one closing element comprises quartz glass and/or borosilicate glass or is made from quartz glass and/or borosilicate glass,
   wherein a housing defines a firing chamber, and the housing comprises at least one through-going opening for leading through the heating element, and
   wherein the at least one closing element is arranged outside and the tube element is arranged inside the firing chamber.

2. The heating element according to claim 1, wherein both ends of the tube element are closed by a closing element, and
   wherein electrical connectors are led out through only one of two closing elements.

3. The heating element according to claim 1, wherein the at least one closing element is connected to the tube element via at least one intermediate element.

4. The heating element according to claim 3, wherein a plurality of intermediate elements are provided which are intermediate glasses and/or transition glasses.

5. The heating element according to claim 4, wherein the intermediate glasses and/or transition glasses have different heat expansion coefficients which range between the heat expansion coefficients of the tube element and the closing element.

6. The heating element according to claim 1, wherein the tube element, the at least one closing element, and a connecting material have the same heat expansion coefficient.

7. The heating element according to claim 1, wherein the heating coil comprises metal alloys or metals having a fusion point of above 2000° C.

8. The heating element according to claim 7, wherein the fusion point of the heating coil is at least 2600° C.

9. The heating element according to claim 1, wherein the tube element is made from a ceramic material.

10. The dental furnace according to claim 1, wherein the at least one through-going opening is closed by a sealing element that surrounds the heating element.

11. The dental furnace according to claim 1, wherein opposite each through-going opening an accommodation element for the heating element or another through-going opening is arranged.

12. The heating element according to claim 1, wherein the heating coil comprises tungsten and/or molybdenum.

13. The heating element according to claim 7, wherein the fusion point of the heating coil is at least 3400° C.

14. The heating element according to claim 1, wherein the tube element comprises a ceramic material.

15. The heating element according to claim 1, wherein the tube element is made from oxide ceramics.

16. The heating element according to claim 1, wherein the tube element comprises oxide ceramics.

17. A heating element for a dental furnace, comprising:
a tube element for accommodating a heating coil inside the tube element, and
at least one closing element for closing an open end of the tube element,
wherein electrical connectors are led out through the at least one closing element,
wherein the heating coil is operated in the tube element which is filled with a protective gas,
wherein a housing defines a firing chamber for a dental furnace, and the housing comprises at least one through-going opening for leading through the heating element, and
wherein the at least one closing element is arranged outside and the tube element is arranged inside the firing chamber.

* * * * *